United States Patent
Park

(10) Patent No.: US 6,266,408 B1
(45) Date of Patent: Jul. 24, 2001

(54) ECHO CONTROLLING APPARATUS OF VIDEO CONFERENCING SYSTEM AND CONTROL METHOD USING THE SAME

(75) Inventor: Jeong-hoon Park, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 08/959,321

(22) Filed: Oct. 28, 1997

(30) Foreign Application Priority Data

Oct. 28, 1996 (KR) .................................................. 96-49340

(51) Int. Cl.[7] ........................................................ H04M 9/08
(52) U.S. Cl. ............................................ 379/410; 379/406
(58) Field of Search ................................... 379/410, 406, 379/407, 408, 409, 411, 202, 420; 381/71.11; 370/289, 290; 709/301; 708/322

(56) References Cited

U.S. PATENT DOCUMENTS

| | | | |
|---|---|---|---|
| 4,558,187 | * 12/1985 | Bill et al. | 179/170.2 |
| 4,972,406 | * 11/1990 | Dedic | 370/32.1 |
| 5,050,160 | * 9/1991 | Fuda | 370/32.1 |
| 5,153,875 | * 10/1992 | Talkatori | 379/410 |
| 5,410,595 | * 4/1995 | Park et al. | 379/410 |
| 5,500,880 | * 3/1996 | Kellermann | 375/377 |
| 5,502,717 | * 3/1996 | Park | 370/32.1 |
| 5,636,323 | * 6/1997 | Umemoto et al. | 379/410 |
| 5,696,819 | * 12/1997 | Suizu et al. | 379/390 |
| 5,706,344 | * 1/1998 | Finn | 379/410 |
| 5,721,771 | * 2/1998 | Higuchi et al. | 379/389 |
| 5,740,242 | * 4/1998 | Hayashi | 379/411 |
| 5,764,759 | * 6/1998 | Hamilton et al. | 379/410 |
| 5,937,060 | * 8/1999 | Oh | 379/406 |

FOREIGN PATENT DOCUMENTS 2-298124  12/1990  (JP) .................................. H04B/3/23
3-16324   1/1991   (JP) .

* cited by examiner

*Primary Examiner*—Stella Woo
(74) *Attorney, Agent, or Firm*—Sughrue, Mion, Zinn, Macpeak & Seas, PLLC

(57) ABSTRACT

A method an apparatus are disclosed for controlling echo in a video conferencing system. A memory device is used for storing a far-end input signal, a near-end input signal and an estimated echo signal as initial parameters to matching the circumstances of a video conferencing system as installed in a particular conference room. An echo controller calculates an initial adaptive filter coefficient using the initial parameters stored in the memory. The echo controller also updates the adaptive filter coefficient using new parameters which are input during a conference. An adaptation controller reads the initial parameters stored in the memory and provides them to the echo controller. The adaptation controller also updates the initial parameters in the memory with signals which are input to the echo controller during the conference, after a predetermined period of time has elapsed. As a result, echo control can be effectively performed from the very initial stage of a video conference.

5 Claims, 3 Drawing Sheets

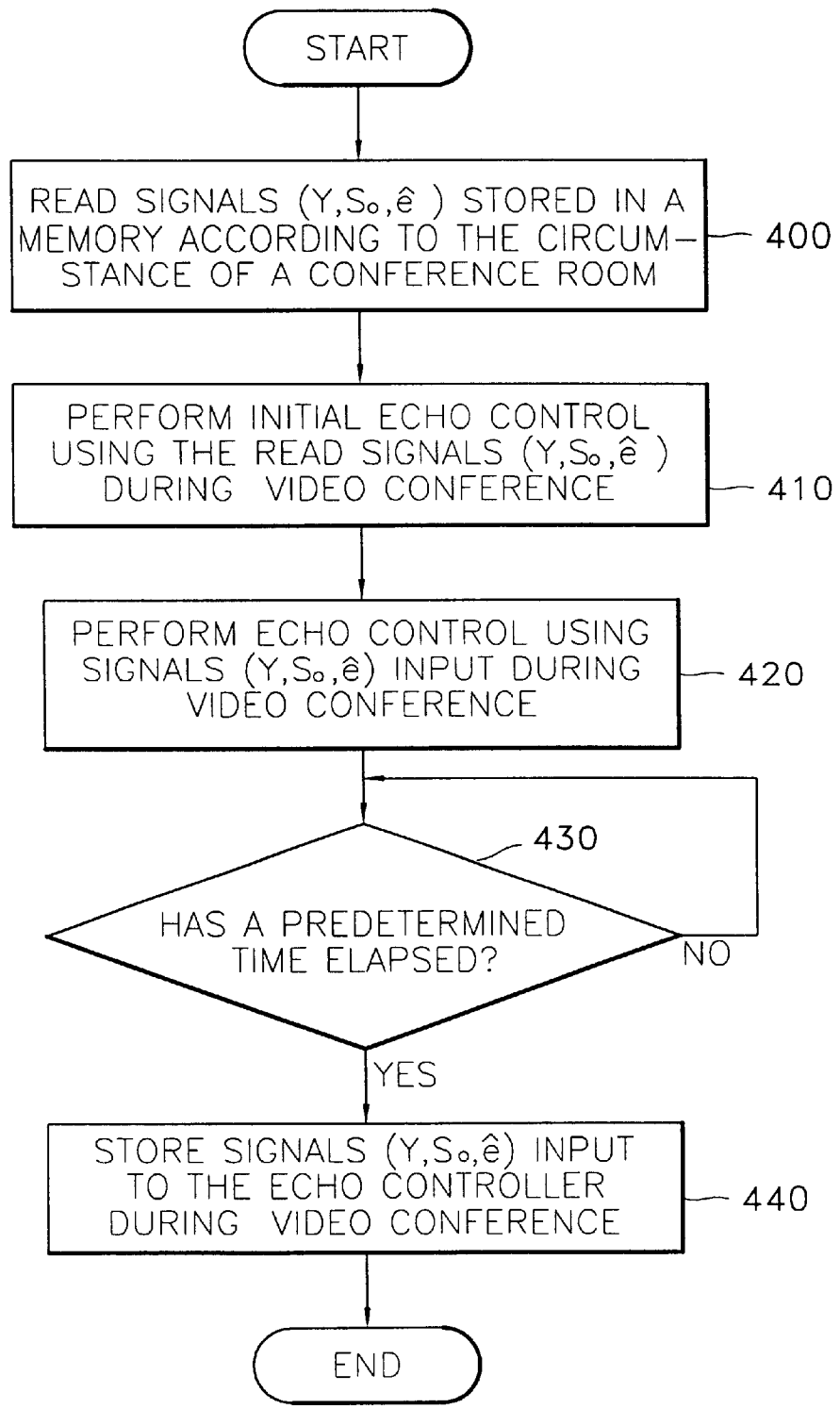

ECHO CONTROLLING APPARATUS OF VIDEO CONFERENCING SYSTEM AND CONTROL METHOD USING THE SAME

This application for an echo controlling apparatus and a control method using that apparatus is based on Korean Patent Application No. 1996/49340, which is incorporated herein by reference for all purposes.

BACKGROUND OF THE INVENTION

1. Field of the Invention

The present invention relates to an echo controlling apparatus for use in a video conferencing system. More particularly, the present invention relates to an echo controlling apparatus of a video conferencing system using a personal computer (PC) and a control method using the same.

2. Description of the Related Art

FIG. 1 is a block diagram illustrating a general video conferencing system.

In FIG. 1, an audio signal of a person in a conference room A taking part in a video conference, generated via a first microphone 10, is transmitted to a second speaker 16 of a conference room B via a first echo controller 11, a transceiver 14, and a second echo controller 15. The audio signal output from the second speaker 16 is provided to a second microphone 18 after being echoed by a wall 17 of the conference room B or being directly coupled to the second microphone 18. If the echo controllers 11 and 15 do not operate to control echo, the audio signal output from the second speaker 16 is fed back to a first speaker 12 at the conference room A via the second microphone 18 and the transceiver 14. The feedback audio signal output from the first speaker 12 is provided to the first microphone 10 after being echoed by a wall 13 of the conference room A or being directly coupled to the first microphone 10. Thus, an echo phenomenon occurs in the conference room A, where the person who has spoken in the conference room A can hear his own voice after a time lag.

The function of the echo controllers will be described with reference to FIG. 2.

Referring to FIG. 2, a far-end input signal Y which is an audio signal transmitted from the opposing conference room is output to the speaker 12 of the conference room A, and includes an echo signal e. The output from an adaptive filter 23 is an estimated echo signal ê. The echo signal e output from the speaker 12 is converted into an electrical signal via the microphone 10, and then input to a subtractor 22. Also, a voice signal of a person speaking in the conference room A to an audience in the remote conference room B, i.e., near-end input signal $S_0$, is provided to the subtractor 22 via the microphone 10.

If the amplitude of the echo signal e input to the subtractor 22 via the microphone 10, which has been output from the speaker 12, is the same as that of the estimated echo signal ê output via the adaptive filter 23, the echo signal e and the estimated echo signal ê are offset, so that only the voice of the person speaking in the conference room, i.e., pure near-end input signal $S_0$, is transmitted without any echoing phenomenon.

The estimated echo signal ê output from the adaptive filter 23 is expressed by the equation ê=h×Y, and an audio input signal S via the microphone 10 is expressed by the equation $S=S_0+e$. In these equations, Y represents a far-end input signal, h represents a transfer characteristic (i.e., an adaptive coefficient) of the adaptive filter, $S_0$ represents a near-end input signal, e represents the echo signal fed back to the microphone 10 from the output of the speaker 12.

An audio signal $S_t$ transmitted to the opposite conference room is expressed by the equation $S_t=S-\hat{e}=S_0+e-\hat{e}$. Echo error is defined as the difference between the estimated echo signal ê and the echo signal e. If the amplitude of the estimated echo signal ê is equal to that of the echo signal e input to the microphone 10, the echo error becomes zero. That is, the echo signal e is not incorporated in the audio signal $S_t$ transmitted to the remote conference room B via a transmission line, so that the audio signal $S_t$ becomes equal to the near-end input signal $S_0$.

During such signal processing, an adaptive filter coefficient h is continuously updated by the equation $$h(n+1)=h(n)+\alpha \times error(n) \times Y,$$

where α is a constant which is set depending on the system and is usually less than 1, and h(n+1) to be updated is calculated using h(n), the constant α, the previous echo error (error(n)) and the far-end input signal Y.

If the initial adaptive filter coefficient h is equal to 0, the estimated echo signal ê becomes zero according to the equation ê=h×Y. As a result, the audio signal transmitted to the opposite conference room B become the sum of $S_0$ and e ($S_t=S_0+e$). That is, in the initial stage, an audio signal including the echo signal e is transmitted to the opposite conference room B. Then, after a predetermined lapse of time, i.e., when the adaptive filter coefficient is not equal to zero, the audio signal $S_t$ including less of the echo signal e is transmitted according to the equation $S_t=S_0+e-\hat{e}$.

Thus, in a video conferencing system adopting such an echo controlling apparatus, an adaptation process is required for a predetermined time since the initial adaptive filter coefficient is equal to zero, which is a characteristic of the echo controlling apparatus. That is, the echo controlling apparatus is operated by simply setting the initial adaptive filter coefficient to zero, without providing appropriate parameters in advance, which are useful to properly set the initial adaptive filter coefficient.

Therefore, the adaptive filter coefficient is set regardless of the circumstances of a video conferencing system in the conference room, so that the preferred echo control cannot be performed until the echo controlling apparatus has adapted.

SUMMARY OF THE INVENTION

To solve the above problem, it is an object of the present invention to provide an echo controlling apparatus and a control method using the same, for controlling echoing at the state when the initial adaptation has been achieved, by calculating an adaptive filter coefficient using parameters stored in advance according to the circumstances of a video conferencing system of a conference room.

According to an aspect of the object, there is provided an echo controlling apparatus in a video conferencing system which includes a memory for storing initial parameters matching the circumstance of a video conferencing system of a conference room. The apparatus has an echo controller for calculating an initial adaptive filter coefficient using the parameters stored in the memory, and for updating the adaptive filter coefficient using new parameters input during a conference, to remove an echo signal. The apparatus also includes a controller for reading the parameters stored in the memory to provide the echo controller with the read parameter, and for updating the initial parameters stored in the memory with the new parameters input to the echo controller.

Preferably, the parameters include values for a far-end input signal, a near-end input signal and an estimated echo signal.

According to another aspect of the object, an echo controlling method in a video conferencing system is provided which comprises the steps of:

(a) reading parameters from a memory which match the circumstances of the video conferencing system as to a particular conference room;

(b) calculating an initial adaptive filter coefficient using the read parameters to control echoing; and (c) updating the initial adaptive filter coefficient with new parameters input during the conference to continuously control echoing.

Preferably, the echo controlling method further comprises the step of storing new parameters in the memory, input during the conference after a predetermined lapse of time from the start of the conference, to update the stored parameters.

BRIEF DESCRIPTION OF THE DRAWINGS

The above object and advantages of the present invention will become more apparent by describing in detail a preferred embodiment thereof with reference to the attached drawings in which:

FIG. 4 is a flowchart illustrating an echo control method using the echo controlling apparatus of FIG. 3.

DESCRIPTION OF THE PREFERRED EMBODIMENT

Figure 1:
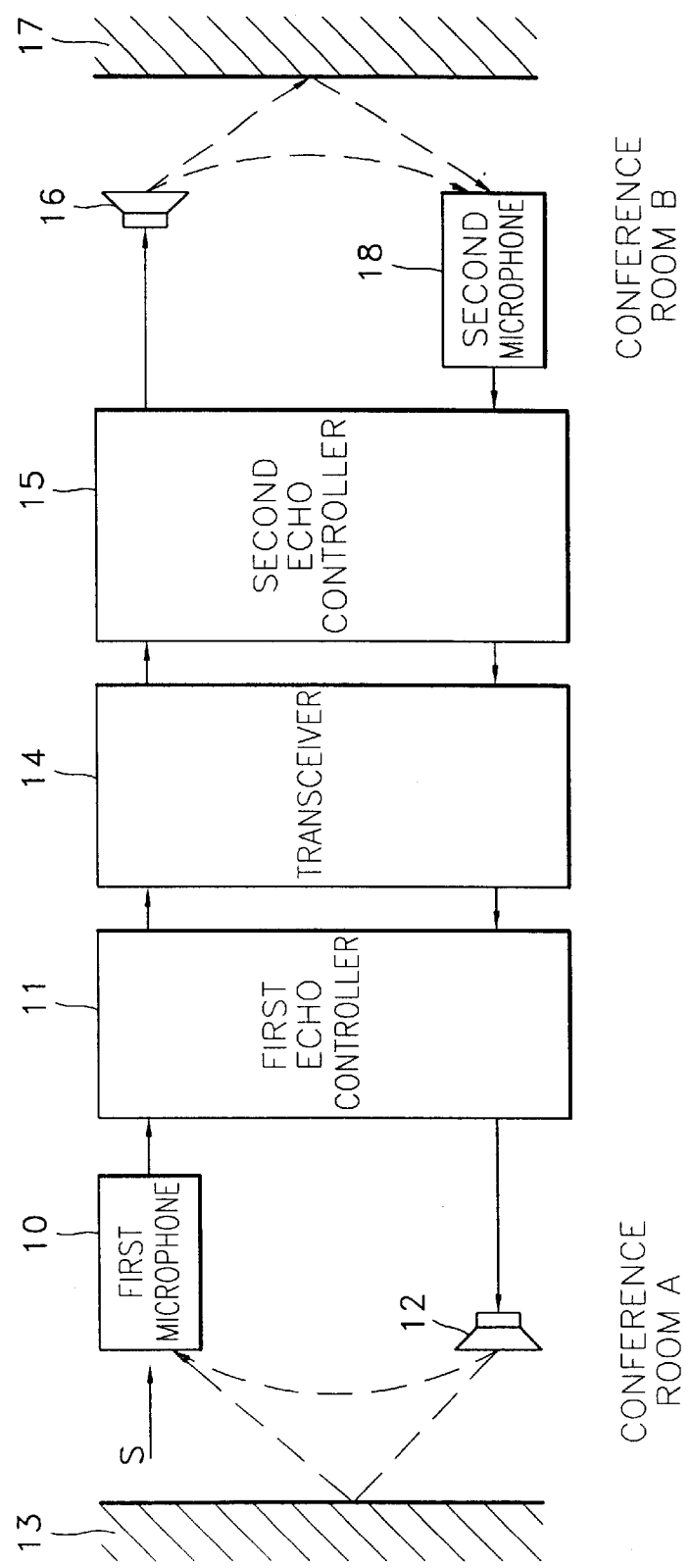
FIG. 1 is a block diagram illustrating a general video conferencing system.
Figure 2:
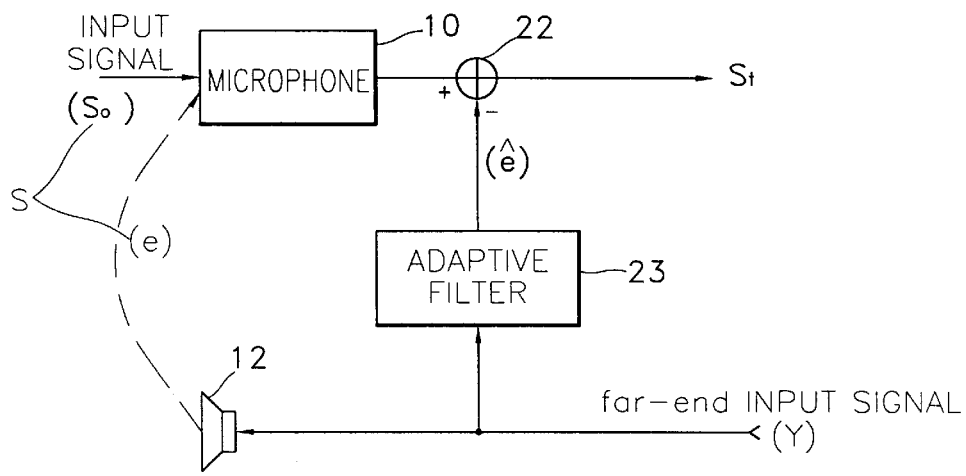
FIG. 2 is a block diagram illustrating an echo controller of FIG. 1.
Figure 3:
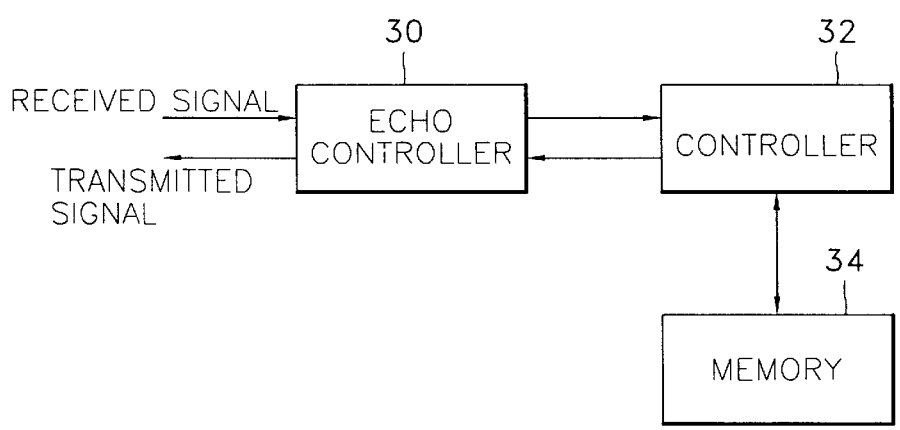
FIG. 3 is a block diagram illustrating an echo controlling apparatus according to the present invention.

In FIG. 3, an echo controlling apparatus of a video conferencing system according to the present invention includes an echo controller 30, an adaptation controller 32 and a memory 34. As an example, the adaptation controller 32 and the memory 34 are implemented by a personnel computer, the memory 34 being a hard disk drive storage device. Of course, any other suitable processor and storage device may alternatively be used. The memory 34 stores predetermined parameters which have been selected so as to match the circumstances of a video conferencing system of a particular conference room. The controller 32 reads the parameters stored in the memory 34 and outputs the read parameters to the echo controller 30 such that an initial adaptive filter coefficient is calculated by the echo controller 30 at the beginning of a conference.

The circumstances of the conference room may change with time. Thus, in order to calculate the initial adaptive filter coefficient which is the closest to the current circumstances, parameters which are fitted to the current circumstance of the conference room are output from the echo controller 30 to the memory 30, after a predetermined lapse of time from the start of the conference.

Referring to FIG. 4, the operation of the echo controlling apparatus of FIG. 3 will be described. The controller 32 reads the far-end input signal Y, the near-end input signal $S_0$ and the estimated echo signal ê from the memory 34, which is matched for the circumstances of the video conference system, and inputs the read signals to the echo controller 30 (step 400). The echo controller 30 calculates the initial adaptive filter coefficient of the echo controller 30 using the input signals Y, $S_0$ and ê, and performs the echo control according to the calculated initial adaptive filter coefficient (step 410).

When the video conferencing is started, the echo controller 30 calculates an adaptive filter coefficient using the echo signal e which is the far-end input signal Y transmitted from the opposite conference room, the near-end input signal $S_0$, via the microphone 10 of the current conference room, and the estimated echo signal ê which is filtered by the adaptive filter 23 from the far-end input signal Y, and performs the echo control according to the real circumstance of the conference (step 420). The echo control is performed by updating the adaptive filter coefficient according to the equation $h(n+1)=h(n)+\alpha \times error(n) \times Y$, such that only the near-end input signal $S_0$ is transmitted to the opposite conference room.

After a predetermined lapse of time (step 430), the controller 32 stores the current signals Y, $S_0$ and ê transmitted from the opposite conference room in the memory 34 (step 440) in order to calculate the more approximate initial adaptive filter coefficient for the next time a conference is started. Thus, the proper adaptive filter coefficient which matches for the circumstances of a video conferencing system of the conference room can be calculated, so that a conference without an echo phenomenon can be achieved, even at the very beginning stage of the conference.

As described above, the apparatus and method of echo control according to the present invention uses parameters stored, in advance, in a memory which match the circumstances of a video conferencing system of a conference room. This permits an initial adaptive filter coefficient to be calculated using the stored parameters to control echoing. As a result, the echo control is performed from the very initial stage of the video conference.

It will be appreciated that various modifications of the described embodiment will be possible without departing from the spirit and scope of the present invention.

What is claimed is:

1. An echo controlling apparatus in a video conferencing system, comprising:

a memory for storing initial parameters matching the circumstances of a video conferencing system installed in a conference room;

an echo controller for calculating an initial adaptive filter coefficient using the parameters stored in the memory, and for updating the adaptive filter coefficient using new parameters input during a conference, to remove an echo signal via an adaptive filter; and an adaptation controller for reading the initial parameters stored in the memory to provide the echo controller with the read out initial parameters, and for updating the initial parameters stored in the memory with new parameters input to the echo controller;

wherein the initial parameters include values for a far-end input signal, a near-end input signal and an estimated echo signal.

2. The echo controlling apparatus of claim 1, wherein said adaptation controller reads the initial parameters from the memory when a conference is started, and updates the initial parameters when a predetermined time has elapsed from when the conference is started.

3. An echo controlling method in a video conferencing system, comprising the steps of:

(a) reading parameters from a memory, which match the circumstances of the video conferencing system of a conference room;

(b) calculating an initial adaptive filter coefficient using the read parameters to control echoing; and (c) updating the initial adaptive filter coefficient with new parameters input during the conference to continuously control echoing;

wherein the stored parameters include values for a far-end input signal, a near-end input signal and an estimated echo signal.

4. The echo controlling method of claim 3, further comprising the step of storing new parameters in the memory, input during the conference after a predetermined lapse of time from the start of the conference, to update the stored initial parameters.

5. The echo controlling method of claim 3, wherein said steps (a) and (b) are performed at the beginning of the conference.

* * * * *